United States Patent

[11] 3,563,459

| [72] | Inventor | Glenn E. Kautz |
| | | Sewickley, Pa. |
| [21] | Appl. No. | 823,215 |
| [22] | Filed | Feb. 10, 1969 |
| | | Division of Ser. No. 602,987, Dec. 19, 1966, now Patent No. 3,462,083 |
| [45] | Patented | Feb. 16, 1971 |
| [73] | Assignee | H. H. Robertson Company |
| | | Pittsburgh, Pa. |
| | | a corporation of Pennsylvania |

[54] DISPERSION METHOD
3 Claims, 8 Drawing Figs.

[52] U.S. Cl. ............................................... 239/8,
239/280, 239/532; 222/145, 222/174
[51] Int. Cl. ............................................... B05b 15/06
[50] Field of Search ............................................... 239/143, 400, 8, 10, 428, 281, 280.5, 280, 532; 222/145, 174

[56] References Cited
UNITED STATES PATENTS

| 1,849,511 | 3/1932 | Thompson | 239/532X |
| 3,061,201 | 10/1962 | Rienecker | 239/281 |
| 3,442,453 | 5/1969 | Whitehouse, Jr. | 239/428X |
| 3,451,786 | 6/1969 | Perrin | 239/428X |
| 3,042,311 | 7/1962 | Edwards et al. | 239/143 |

*Primary Examiner*—M. Henson Wood, Jr.
*Assistant Examiner*—John J. Love
*Attorney*—Harry B. Keck ABSTRACT: A method for producing polyurethane foam at a remote location. Two streams of polyurethane foam ingredients are delivered to a delivery nozzle in the remote location along with a stream of inert gas. The inert gas creates turbulence in the mixing nozzle for the mixing of the two urethane foam ingredient streams.

INVENTOR.
GLENN E. KAUTZ

PATENTED FEB 16 1971

INVENTOR
GLENN E. KAUTZ
BY
Harry B Keck
ATTORNEY

DISPERSION METHOD

This application is a division of copending application Ser. No. 602,987 filed Dec. 19, 1966, assigned to the assignee of the present application and now U.S. Pat. No. 3,462,083.

BACKGROUND OF THE INVENTION

Many elaborate mixing nozzles or mixing heads have been developed for combining two liquid streams in a predetermined proportion, especially for use in preparing polyurethane foaming compositions. Typical nozzles for this purpose are described in U.S. Pat. Nos. 2,779,689; 3,042,311; and 3,091,551. Each of these mixing nozzles can be characterized by the bulkiness of the construction from which the mixture of the two polyurethane foaming ingredients are dispersed. Such mixing nozzles are useless where it is desired to introduce foaming polyurethane ingredients between extensive sidewalls which are spaced apart by 1 or 2 inches -- sidewalls of the type which might be expected in building construction panels, automotive truck bodies, refrigerator doors and casings, and the like.

DESCRIPTION OF THE INVENTION

The present invention employs a compact mixing nozzle, particularly useful for blending polyurethane foam ingredients. The compact nozzle can be introduced into structural cavities having extensive sidewalls spaced apart by distances of the order of 1 to 2 inches. The mixing nozzle itself included four essentially parallel passageways and a central mixing chamber. The two lateral passageways receive an inert gas such as air while the two inner passageways receive separately the two reacting polyurethane foam ingredients flowing at a previously metered flow rate corresponding to the proportions of the two materials required to produce the resulting polyurethane foam. The two central passageways communicate with the inlet end of the mixing chamber. The forward or outlet end of the central mixing chamber is the outlet port of the mixing nozzle. There are a number of connecting ducts between the lateral passageways and the central mixing chamber for flow of inert gas to create a turbulent environment which promotes homogeneous mixing of the two liquid ingredients. Each of the four passageways joins a separate fluid conveying tube which extends rearwardly from the mixing nozzle to a manifold in a remote location. The four tubes are disposed in parallel array and are connected to the manifold by a suitable adapter. Preferably the tubes and the mixing head are secured to a rigid structural channel which can be easily manipulated to direct the dispersion of polyurethane foam.

OBJECTS

Objects of the invention are:

To provide a method for introducing foaming polyurethane compositions at locations remote from the operator;

To provide a method for introducing foaming polyurethane compositions into structural cavities.

The objects and advantages of the present invention will become apparent from the following detailed description by reference to the accompanying drawings in which.

Figure 1:
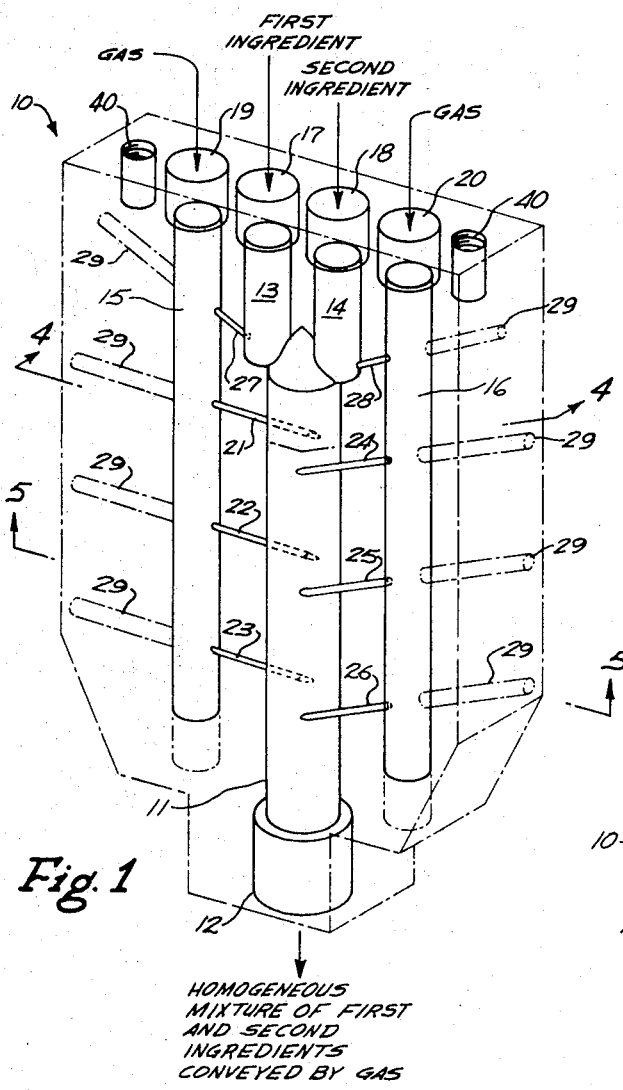
FIG. 1 is a phantom perspective view of the present mixing nozzle with the interior passageways, ducts and mixing chamber in view.

Referring to FIG. 1, the present mixing nozzle 10 is preferably formed from a solid block of suitable material such as stainless steel, brass or aluminum alloy.

Within the nozzle 10 is central bore 11 serving as a mixing chamber. The forward end of the bore 11 preferably has an expanded diameter well 12 to receive a delivery tube (not shown). It will be observed that the central bore 11 terminates short of the rearward end of the nozzle 10 and communicates with a pair of ingredient bores 13, 14 which are generally parallel to each other and generally parallel to the axis of the central bore 11. A pair of lateral bores 15, 16 is provided which are generally parallel to each other and generally parallel to the axis to the central bore 11. Each of the bores 13, 14, 15, 16 is provided with an expanded diameter well 17, 18, 19, 20 respectively to receive a tube end. It will be observed that the lateral bores 15, 16 terminate within the nozzle 10 short of its forward end.

A number of inclined ducts 21, 22, 23 extend from the lateral bore 15 and enter into the central bore 11. Additional inclined ducts 24, 25, 26 extend from the lateral bore 16 into the central bore 11. Preferably the inclined ducts 21, 22, 23, 24, 25, 26 enter the central bore 11 tangentially to its cylindrical wall, see FIG. 5. An additional duct 27 extends from the lateral bore 15 into the ingredient bore 13. An additional duct 28 extends from the lateral bore 16 into the ingredient bore 14. The inclined ducts 21 to 28 inclusive can be fabricated by drilling from the surface of the nozzle 10 through the lateral bores 15, 16 as the case may be to the required depth. Thereafter the drilled-out portions 29 from the ducts 21 to 28 (between the lateral bores 15, 16 and the surface of the nozzle 10) are plugged with a suitable metallic or plastic sealing material.

OPERATION

Figure 8:
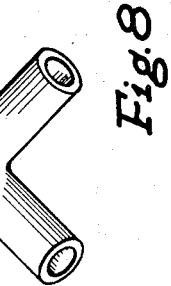
FIG. 8 is a perspective illustration of a delivery tube useful with the present nozzle.

In operation, the mixing nozzle 10 receives a first ingredient in the first bore 13 at a predetermined flow rate and receives a second ingredient in the second ingredient bore 14 at a predetermined flow rate. An inert carrying gas, preferably air, is introduced into each of the lateral bores 15, 16 at a preselected pressure. It will be observed that the first and second ingredient bores 13, 14 are displaced from the axis of the central bore 11. A stream of air is delivered from the lateral bore 15 through the duct 27 into the first ingredient bore 13 adjacent to the intersection of the first ingredient bore 13 and the inlet end of the mixing chamber 11. The air promotes the flow of the first ingredient from the bore 13 into the mixing chamber 11. Similarly air is delivered from the lateral conduit 16 through the duct 28 into the second ingredient bore 14 adjacent to the intersection of that second ingredient bore with the inlet end of the mixing chamber 11 to promote the flow of the second ingredient into the mixing chamber 11. Currents of air or conveying gas are introduced into the mixing chamber 11 through the ducts 21, 22, 23, 24, 25, 26 to promote turbulence and agitation of the two liquid streams of first and second ingredients. A homogeneous mixture of the first and second ingredients is delivered from the front end of the nozzle 10 through the expanded well 12. A flow directing tube such as the Y-tube 43 of FIG. 8 may be attached to the nozzle 10 by insertion into the expanded diameter well 12.

By selecting the pressure of the gas which is delivered to the passageways 15, 16, the mixture of ingredients can be dispersed from the mixing nozzle 10 in the form of a flowing creamy mixture or in the form of a spray. Both types of delivery have been found to be useful.

Figure 3:
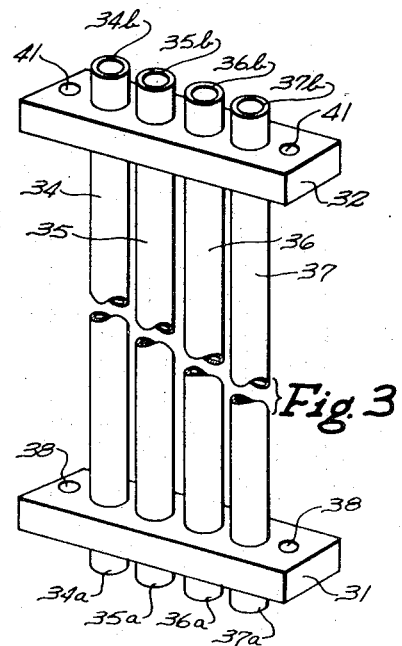
FIG. 3 is a broken perspective view showing the connecting tubes which join a control zone manifold and the present mixing nozzle including suitable adapters for securing the tubes at one end to the manifold and at the other end to the present mixing nozzle.
Figure 2:
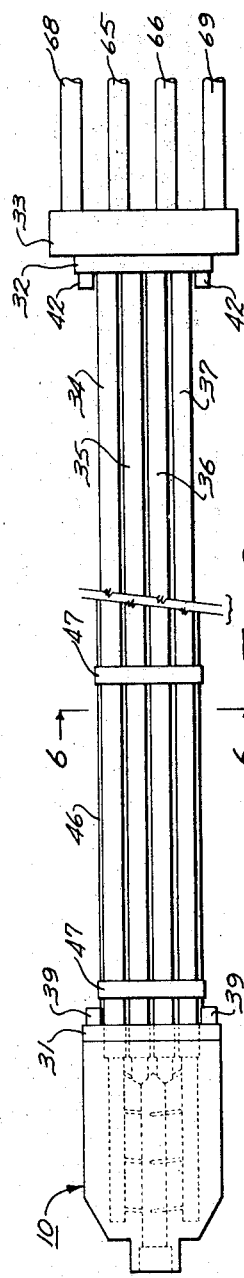
FIG. 2 is a broken plan view showing a manifold adapter and, remotely located with respect thereto, the mixing nozzle of this invention.

Four tubes 34, 35, 36, 37 of any desired length are provided as shown in FIGS. 2, 3 with an adapter 31 at one end for confining the tube ends and for retaining the tube ends in the tubing wells of the mixing nozzle 10. An adapter 32 is provided at the other end of the tubes for confining the tube ends in a suitable manifold 33 which is a source of the inert carrying gas and the reactive ingredients to be hereinafter more fully described. The four tubes 34, 35, 36, 37 are thus confined at each end in an adapter 31, 32. The adapter 31 includes a pair of clearance openings 38 to receive screws 39 which connect the adapter 31 to the mixing nozzle 10 by threaded engagement with holes 40.

Similarly the adapter 32 has clearance openings 41 for receiving screws 42 which connect the adapter 32 to the manifold 33. The tube ends 34a, 35a, 36a, 37a are tightly engaged within the expanded wells 19, 17, 18, 20 respectively of the mixing nozzle 10. The tube ends 34b, 35b, 36b, 37b, similarly are tightly engaged within the expanded wells of the manifold 33, not shown in detail.

Figure 4:
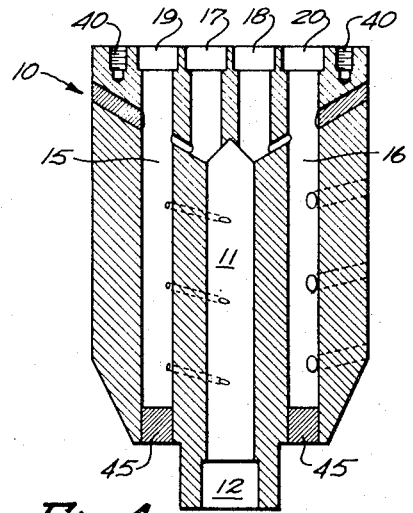
FIG. 4 is a cross section view of the present mixing nozzle taken along the line 4-4 of FIG. 1.

It may be desirable, as shown in FIG. 4, to drill the bores 15, 16 entirely through the block of material constituting the mixing nozzle 10. The forward ends of the bores can be plugged up with a suitable sealing material 45 as shown in FIG. 4.

Preferably the communicating ducts 21 to 26 inclusive should be inclined i.e., directed toward the forward end of the nozzle 10 as they proceed from the lateral bores 15, 16 toward the central bore 11. Preferably the ducts 21 to 26 are inclined at an angle of about 85° with respect to the axis of the central bore 11. It is also possible that each of succeeding connecting ducts 21 to 26 inclusive can carry a decreased inclination angle as it proceeds from the lateral bore 15, 16 to the central bore 11.

Figure 5:
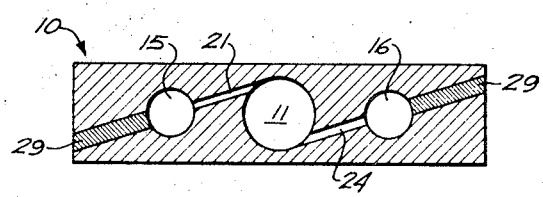
FIG. 5 is a cross section view of the present mixing head taken along the line 5-5 of FIG. 1.

The communicating ducts 21, 24 in FIG. 5 are shown entering the central bore 11 tangentially to create clockwise turbulence. The remaining ducts 22, 23, 25, 26 may enter the central bore clockwise or counterclockwise. When the entry of the ducts was mixed, i.e., some clockwise and some counterclockwise, excellent mixing properties were observed.

The ducts 27, 28 which extend from the gas passageways 15, 16 to the ingredient passageways 13, 14 near the junction with the central bore 11 provide positive pressure to prevent blowing mixed ingredients back into the ingredient bore 13, 14 in the event of blockage in the mixing chamber 11.

Figure 6:
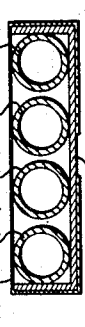
FIG. 6 is a cross section view taken along the line 6-6 of FIG. 2.

As shown in FIG. 2, the mixing nozzle 10 and the four ingredient tubes 34, 35, 36, 37, are preferably secured to a rigid structural channel 46 by suitable means such as wraps 47 of tape. One typical rigid channel section 46, illustrated in FIG. 6, provides puncture protection for the tubes 34, 35, 36, 37 and provides a convenient means for an operator at the rearward end of the channel 46 to manipulate and direct the location of the mixing nozzle 10 which is secured to the forward end.

As further seen from FIG. 2, the channel 46 can extend for any convenient length such as 10 to 20 feet. The remaining distance between the rear end of channel 46 and the manifold 33 can be varied by virtue of the flexibility of the tubes 34, 35, 36, 37.

Heretofore, the manifold 33 has been described as a general source of inert carrying gas and the reactive ingredients. A typical polyurethane foaming system showing the functioning of a typical manifold 33 is presented in FIG. 7.

Figure 7:
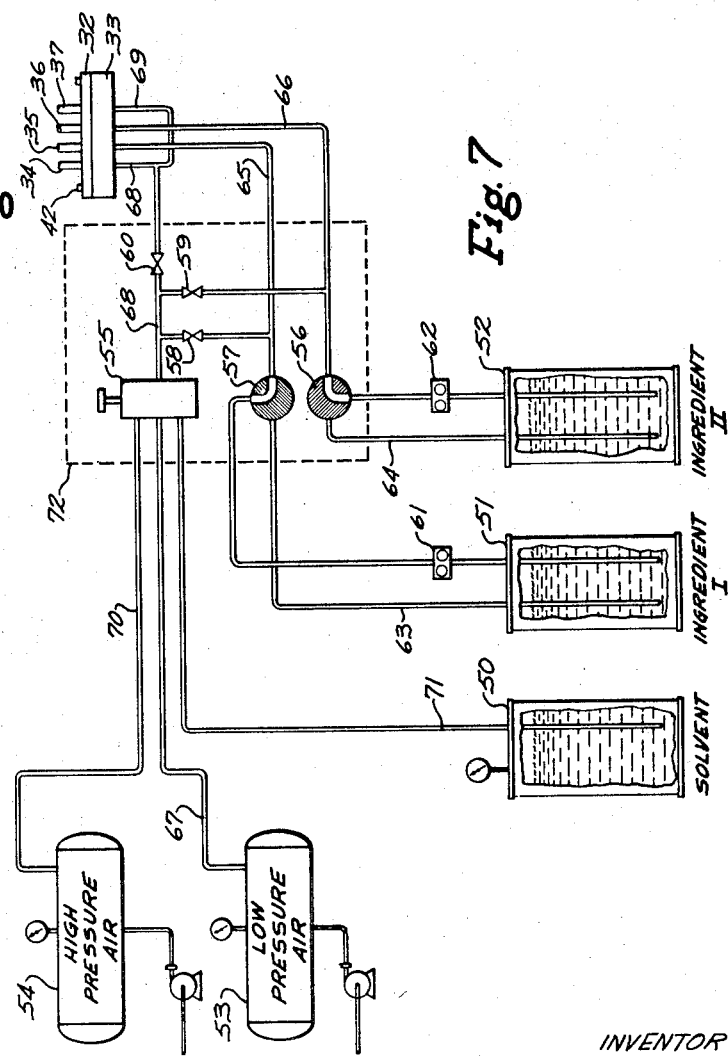
FIG. 7 is a schematic illustration of suitable related apparatus for dispersing polyurethane foam in a structural cavity.

Referring to FIG. 7 there is illustrated a schematic representation of suitable apparatus for dispersing polyurethane foam at a remote location. The apparatus shown in FIG. 7 includes a tank 50 of suitable solvent; a tank 51 of polyurethane ingredient I such as a polyol; a tank 52 of the coreactive polyurethane ingredient II such as a polyisocyanate ingredient; a source 53 of relatively low-pressure air, about 15—25 p.s.i.g.; a source 54 of high-pressure air at about 100 p.s.i.g.; a selector valve 55 which is adapted to receive high-pressure air, low-pressure air and solvent and to deliver any one or none of these input materials according to the desires of the operator; a pair of three-way valves 56, 57 and three flow-control valves 58, 59, 60. The valves 55 to 60 inclusive are preferably grouped in a control zone 72.

The liquid reactive ingredients I and II are withdrawn from the tanks 51, 52 respectively through continuously operating positive displacement pumps 61, 62 which deliver the fluid ingredients each at a predetermined flow rate which is selected to develop the desired polyurethane foam composition. When the system is not generating polyurethane foam, the three-way valves 56, 57 divert the liquid output flow of the positive displacement pumps 61, 62 through recirculation pipes 63, 64 back to the supply tanks 51, 52 respectively. When the operator desires to produce polyurethane foam, the two three-way valves 56, 57 are turned to direct the ingredients through the output pipes 65, 66 to the manifold 33. Preferably the three-way valves 56, 57 are mechanically ganged together so that both are opened at the same instant and closed at the same instant.

Under normal operation, i.e., when polyurethane foam is being delivered from the nozzle 10, low-pressure air from the tank 53 is delivered through the pipe 67 and the selector valve 55 to pipes 68, 69 into the manifold 33. The flow control valve 60 is open under these circumstances.

The remaining connections are available for purging the system lines between specific jobs and in preparation for shutdown. The gas passageways within the nozzle 10 are purged by delivering high-pressure air from the tank 54 through the pipe 70, through the selector valve 55, through the pipes 68, 69 and through the manifold 33. If desired, a slug of solvent can be delivered from the pressurized solvent tank 50 through the pipe 71, through the selector valve 55, through pipes 68, 69 and through the manifold 33. Normally when a slug of solvent is introduced into the air lines, it will be flushed through the system by a succeeding slug of low-pressure air from the tank 53. The solvent must be capable of dissolving both ingredients I and II. Halogenated aliphatic compositions are preferred such as methylene chloride.

The ingredient lines can be purged by initially directing a blast of high-pressure air from the tank 54 through the pipe 70, through the selector valve 55, through the valves 58 or 59 to the pipes 65 or 66 respectively, thence through the manifold 33. The valves 56, 57 will, of course, be diverting the ingredients I and II back to the tanks 51, 52 through pipes 63, 64 while the pipes 65, 66 are receiving solvent or air. If desired, solvent can be delivered from the pressurized solvent tank 50 through the pipe 71, through selector valve 55 and through the valves 58 and/or 59. The slug of solvent normally will be followed by a slug of low-pressure air from the tank 53 through the pipe 70, through selector valve 55, through the valve 58 or 59 and through pipe 65 or 66.

RESULTS

The present nozzle has been utilized with commercially available two-component polyurethane systems including a polyisocyanate ingredient and a polyol ingredient. The necessary catalysts, surfactants, blowing agents and auxiliary components were provided in one or the other or both of the two components.

The mixing nozzle 10 had a thickness of one-half inch, a width of 2⅛ inches and a length of 3½ inches. The nozzle 10 was fabricated from a block of brass metal. The central bore 11 had a ⅜-inch diameter. The remaining bores 15, 16, 17, 18 had a diameter of one-fourth inch.

The connecting tubes 34, 35, 36, 37 were ⅝-inch diameter polypropylene tubing having a length of about 15 feet. The polyol ingredient was supplied at a rate of about one part per 0.95 part of the polyisocyanate prepolymer. The two ingredients were supplied at the rate of about 4 pounds per minute (cumulative) to produce a polyurethane foam of remarkable uniformity having a free-rise density of about 2.2 pounds per cubic foot. When the mixing nozzle was introduced into a confined cavity of a construction panel having a wall-to-wall separation of about 1⅜ inches, the average polyurethane foam density was about 3.85 pounds per cubic foot. This is reported as an overall average density of the foam. In other building panels where the wall-to-wall displacement varied because of deliberate corrugations of the facing sheet from 1.5 inches to about 3.25 inches, the resulting polyurethane foam had an overall average density of about 3.19 pounds per cubic foot.

The air pressure required to produce suitable flow is approximately 13 p.s.i. although pressures from about 15 to 25 p.s.i. are preferred. At air pressures below about 10 p.s.i. the mixing achieved with the present mixing nozzle was inadequate as evidenced by the fact that streaks of unreacted prepolymer material were observed in the poured polyurethane foam. At air pressures above about 25 p.s.i., excellent mixing of the ingredients is achieved but the accompanying splattering of the mixture is undesirable where the mixing nozzle is to be used in a confined cavity.

After each individual batch of polyurethane foam is delivered through the present mixing nozzle, the mixing chamber 11 is purged by introducing a small quantity of a suitable solvent such as a halogenated aliphatic composition, preferably methylene chloride, into the mixing chamber by delivering it through the gas delivery tubes 34, 37 into the mixing nozzle passageways 15, 16. Before introducing the solvent, a blast of high-pressure air, e.g., about 100 p.s.i., is blown through the tubes 34, 37 after the reactive ingredients flow has been terminated to purge all of the readily removable material from the mixing chamber 11. Thereafter the solvent carries away any residual ingredients from the central bore 11. The amount of solvent required for this between-job purges is about 6 to 12 inches of solvent in a ¼-inch diameter tube, i.e., about 5 to 10 ml. The flow of solvent is followed by a slug of relatively low-pressure air, e.g., about 25 p.s.i. Residual solvent is removed from the system with a subsequent further blast of the high-pressure air so that the system remains in a ready condition for the next job.

When the system is purged at the end of a day's activity for an extensive shutdown, high-pressure air is first introduced into the ingredient tubes 35, 36 to purge all of the unreacted ingredients from the tubes 35, 36 and from the mixing chamber 11. Thereafter a quantity of suitable solvent such as methylene chloride is introduced through the tubes 35, 36 and blown with low-pressure air through the bores 13, 14 and the mixing chamber 11. Quantities of the solvent are alternated with blasts of low-pressure air until the solvent is discharged through the forward end of the nozzle 10 in a relatively clean condition. Generally about 6 to 12 slugs of solvent will accomplish the necessary cleaning. After the last solvent is blown through the system, a blast of high-pressure air, at about 100 p.s.i., is introduced through the tubes 34, 35 to clean the entire system and leave it in standby condition. The amount of solvent required for shutdown purging of the system is usually less than 1 quart.

The capacity of the mixing nozzle just described ranges from about 2 pounds per minute to about 8 pounds per minute with excellent mixing of the ingredients as evidenced by the uniformity of the polyurethane foam.

Where the mixing nozzle 10 is to be introduced in relatively long, narrow cavities, it may be desirable to place a Y-outlet spout on the expanded diameter well 12 in order to disperse the foaming ingredients in opposite directions to improve the spreading.

I claim:

1. A method of dispersing polyurethane ingredients in a coreacting state at a location which is remote from an operator comprising:

establishing and directing a first discrete liquid stream of polyurethane foam ingredients and a second discrete liquid stream of polyurethane foam ingredients along a structural element, each at a predetermined flow rate which will produce polyurethane foam of desired properties upon homogeneous mixing of the two streams;

depositing a delivery nozzle at said location by securing the nozzle to said structural element and extending the structural element to the desired remote location, said structural element being rigid whereby an operator at one end of said structural element can precisely control the location of the said delivery nozzle at the other end of the said structural element;

establishing and maintaining a stream of inert gas along said structural element and through said delivery nozzle;

directing said first and second discrete streams to said delivery nozzle; and turbulently mixing said first and second streams with said stream of inert gas and delivering the resulting mixture at said location.

2. The method of claim 1, wherein the said structural element and the said first and second liquid streams and the said stream of inert gas flowing therealong, extend rearwardly of the said delivery nozzle whereby the said delivery nozzle may be introduced into structural cavities having extensive sidewalls which are spaced apart by a distance of the order of a minor fraction of a foot.

3. The method of claim 1, wherein the flow rate of said first and second liquid streams and said stream of inert gas are regulated by control devices remote from said structural element and said delivery nozzle.